(12) United States Patent
Guesdon

(10) Patent No.: US 6,789,746 B2
(45) Date of Patent: Sep. 14, 2004

(54) CONNECTING DEVICE CONNECTING A SPRAY BOOM TO A CHASSIS OF AN AGRICULTURAL SPRAYER AND SPRAYER EQUIPPED WITH SUCH A CONNECTING DEVICE

(75) Inventor: Alain Guesdon, Noisy sur Ecole (FR)

(73) Assignee: Kuhn-Nodet S.A., Montereau (FR)

( * ) Notice: Subject to any disclaimer, the term of this patent is extended or adjusted under 35 U.S.C. 154(b) by 152 days.

(21) Appl. No.: 09/808,168

(22) Filed: Mar. 15, 2001

(65) Prior Publication Data

US 2001/0022322 A1 Sep. 20, 2001

(30) Foreign Application Priority Data

Mar. 17, 2000 (FR) ............................................ 00 03454

(51) Int. Cl.⁷ ................................................ B05B 1/20
(52) U.S. Cl. ..................... 239/167; 239/161; 239/159; 172/444; 172/677; 172/680
(58) Field of Search ................. 239/146–167; 172/444, 439, 677, 679, 680

(56) References Cited

U.S. PATENT DOCUMENTS

| 4,394,968 A | * | 7/1983 | Tyler ........................... 239/167 |
| 4,858,698 A | * | 8/1989 | Williamson et al. ......... 172/439 |
| 5,346,018 A | * | 9/1994 | Koster ......................... 172/439 |
| 5,855,245 A | * | 1/1999 | Gerein ........................ 172/677 |
| 6,047,901 A | * | 4/2000 | Pederson et al. ........... 239/172 |
| 6,343,661 B1 | * | 2/2002 | Thompson et al. ......... 239/159 |

FOREIGN PATENT DOCUMENTS

| FR | 2 759 544 A | | 8/1998 | |
| GB | 2102661 | * | 7/1982 | ................ 239/164 |
| GB | 2 098 841 A | | 12/1982 | |

* cited by examiner

Primary Examiner—Dinh Q. Nguyen
(74) Attorney, Agent, or Firm—Oblon, Spivak, McClelland, Maier & Neustadt, P.C.

(57) ABSTRACT

A connecting device connecting a spray boom to a chassis of an agricultural sprayer, said connecting device is noteworthy in that it consists of a single quadrilateral arranged in a plane which is substantially vertical and substantially parallel to a longitudinal plane of said sprayer.

15 Claims, 5 Drawing Sheets

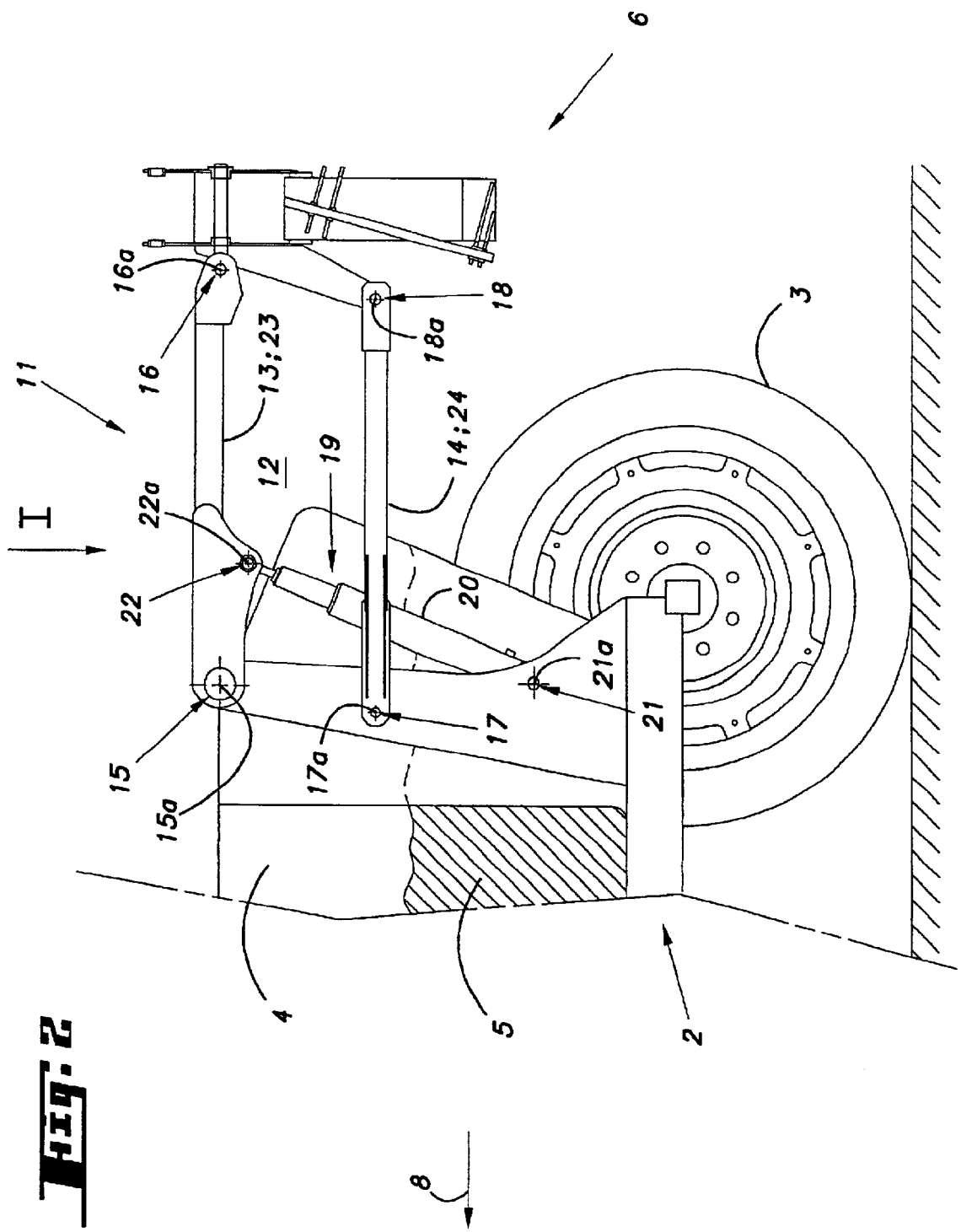

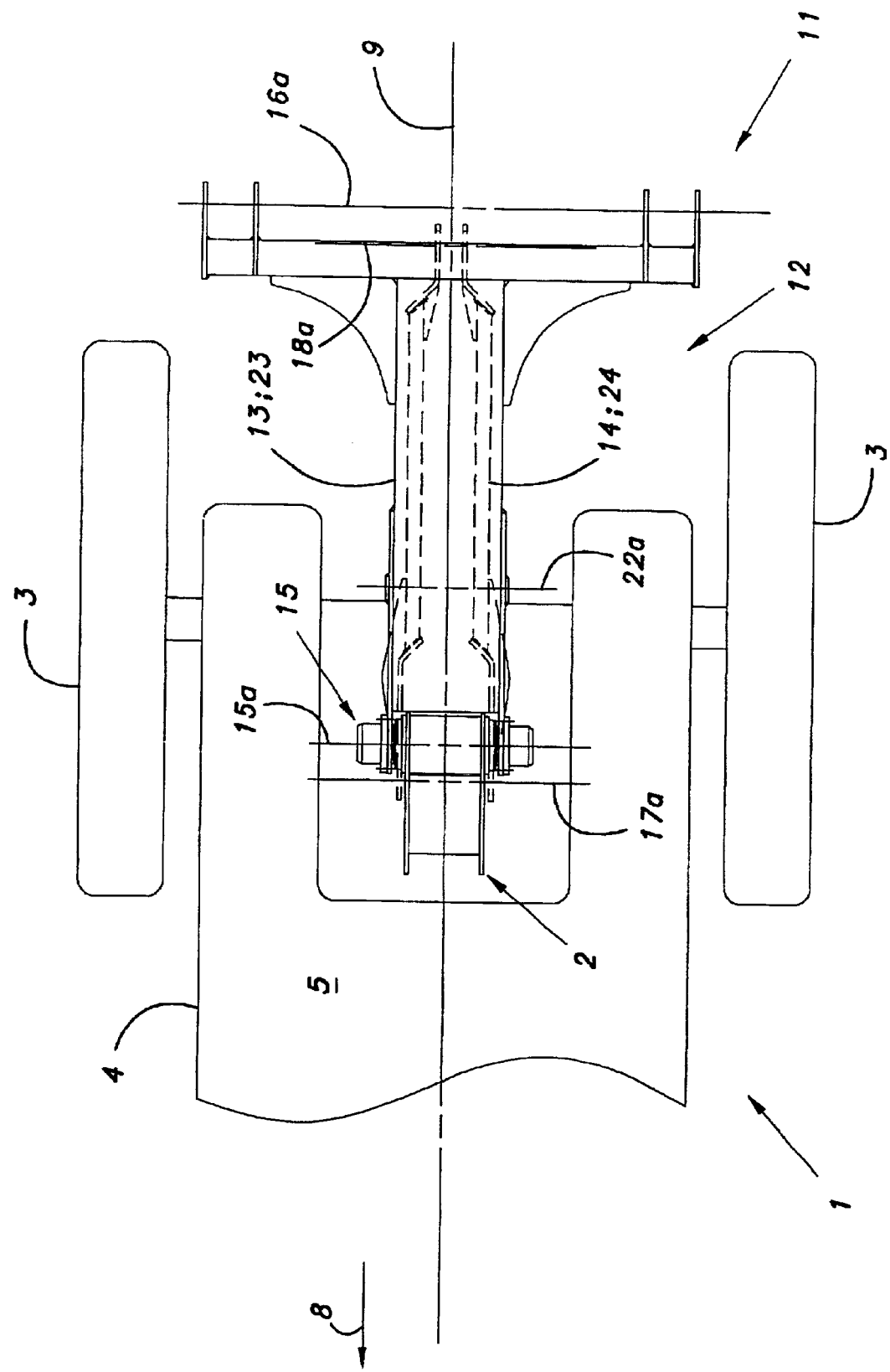

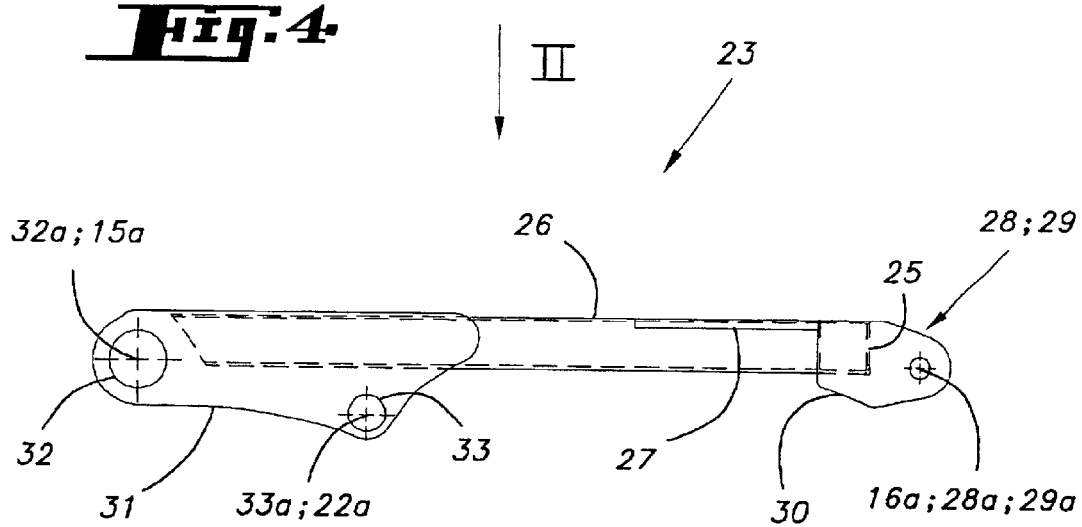
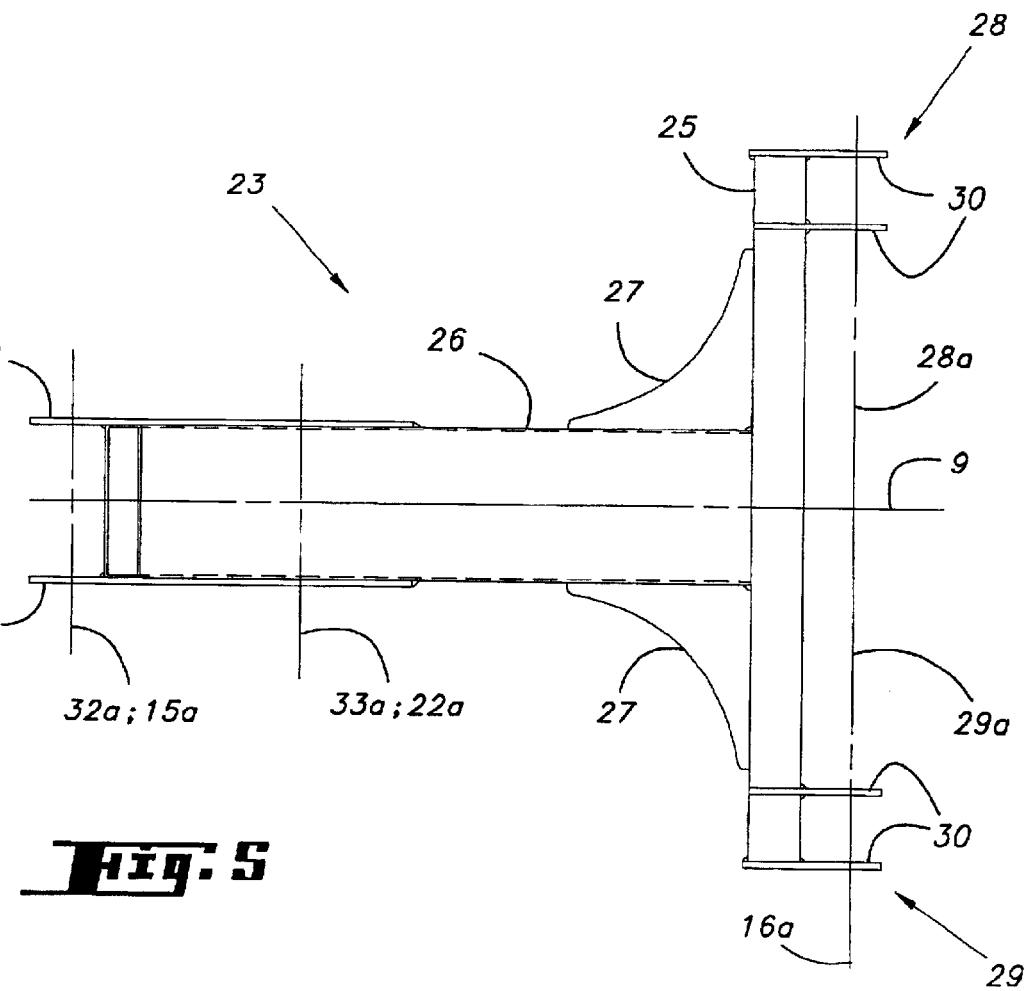

CONNECTING DEVICE CONNECTING A SPRAY BOOM TO A CHASSIS OF AN AGRICULTURAL SPRAYER AND SPRAYER EQUIPPED WITH SUCH A CONNECTING DEVICE

BACKGROUND OF THE INVENTION

1. Field of the Invention

The present invention relates to a connecting device connecting a spray boom to a chassis or to an element secured to the chassis of an agricultural sprayer.

2. Discussion of the Background

A connecting device such as this is known to those skilled in the art. Specifically, patent application FR 2 759 544 describes an agricultural sprayer comprising, among other things, a chassis equipped with wheels and a number of spray nozzles arranged at substantially regular intervals along a boom. During work, said boom is deployed transversely to a direction of forward travel of said sprayer and said nozzles spray a product onto plants that are to be treated. In this prior-art document, said boom is connected to said chassis by means of two identical parallelograms which extend in approximately vertical respective planes. Said parallelograms can be deformed by means of a respective hydraulic ram. This deformation of the parallelograms allows said boom to be shifted with respect to said chassis, mainly in a vertical direction, so as to adapt the spraying height of said nozzles to the taller or shorter size of the plants to be treated. In this document, said parallelograms are arranged symmetrically on each side of a vertical mid-plane of said sprayer, and the supply circuits for said rams are connected up in parallel.

With such a connecting device, various factors mean that in practice said parallelograms do not deform at the same speed. In consequence, said boom, as it is shifted with respect to said chassis, will become inclined with respect to a horizontal plane by pivoting about a longitudinal axis of said sprayer. As a result, the spray height of said nozzles is no longer uniform, which is detrimental to the correct distribution of said product over the plants treated. In addition, when the boom moves away from said horizontal plane, the distribution of the weight of said boom between the two parallelograms is no longer symmetric, this distribution being to the detriment of the lowermost parallelogram. This difference in loading between the parallelograms further exacerbates the difference between said deformation speeds, hence making the phenomenon worse. This results in very heavy stresses on the various pivot points and on the various arms that make up the connecting device and, in the case of sprayers with a wide span, there is even the risk that said boom might strike the ground.

Experience has also shown that a device with two parallelograms, such as the one described in this earlier document, does not afford satisfactory rigidity in the face of stresses orthogonal to said vertical mid-plane. Indeed what happens is that when working on sloping ground, for example, or more generally when said sprayer is running over uneven ground, said boom is often found to flap undesirably with respect to said chassis in a direction transverse to said direction of forward travel. This flapping in turn places significant and repetitive stress on said pivot points that make up the connecting device, and also disrupts the correct distribution of said product over the plants treated.

The two observations described hereinabove have led those skilled in the art to strengthen this known connecting device, for example by joining the two parallelograms together using crossmembers.

However, this stiffening makes the operations of mounting said connecting device harder. In addition, it leads to an increase in the mass of the assembly and to an increase in the cost of manufacture which is already hampered by the use of two hydraulic rams.

SUMMARY OF THE PRESENT INVENTION

The object of the present invention therefore aims to overcome the various drawbacks of the state of the art by producing a connecting device which is less expensive to manufacture and easier to mount while at the same time having good mechanical behaviour.

The objective assigned to this invention is achieved by means of a connecting device characterized in that it consists of a single quadrilateral arranged in a plane which is substantially vertical and substantially parallel to the longitudinal plane of the sprayer.

Indeed, the use of such a device makes it possible to reduce considerably, by comparison with the state of the art, the number of parts needed for making the connection between a spray boom and a chassis of an agricultural sprayer or an element secured to said chassis, hence making the assembly easier to mount and the construction less expensive.

Another feature of the invention consists in using just one ram to deform this device, hence yielding an even greater drop in the cost of manufacture.

Another feature of the invention lies in the fact that this quadrilateral is made up of a carrying arm and of an orienting arm. Said carrying arm is intended to take most of the stress applied by the spray boom, whereas the orienting arm has the single function of keeping the orientation of a plane in which said boom extends substantially vertical. Thus, the distribution of load between the carrying arm and the orienting arm is set. It is therefore easy to optimize the shape of these arms to guarantee correct dynamic behavior of the boom.

BRIEF DESCRIPTION OF THE DRAWINGS

Other features of the invention will emerge further in the other sub-claims and in the following description of one nonlimiting example of an embodiment according to the invention depicted in the appended drawings, in which:

FIG. 2 depicts, also in a side view but on a different scale and with partial section, the rear of the agricultural sprayer of FIG. 1 where a connecting device according to the invention is mounted, FIG. 3 depicts, viewed in the direction of arrow I, both the rear of the sprayer and the connecting device depicted in FIG. 2, FIG. 4 depicts, in side view, an exemplary embodiment of a carrying arm according to the invention, FIG. 5 depicts, viewed in the direction of arrow II, the carrying arm of FIG. 4.

DESCRIPTION OF THE PREFERRED EMBODIMENTS

Figure 1:
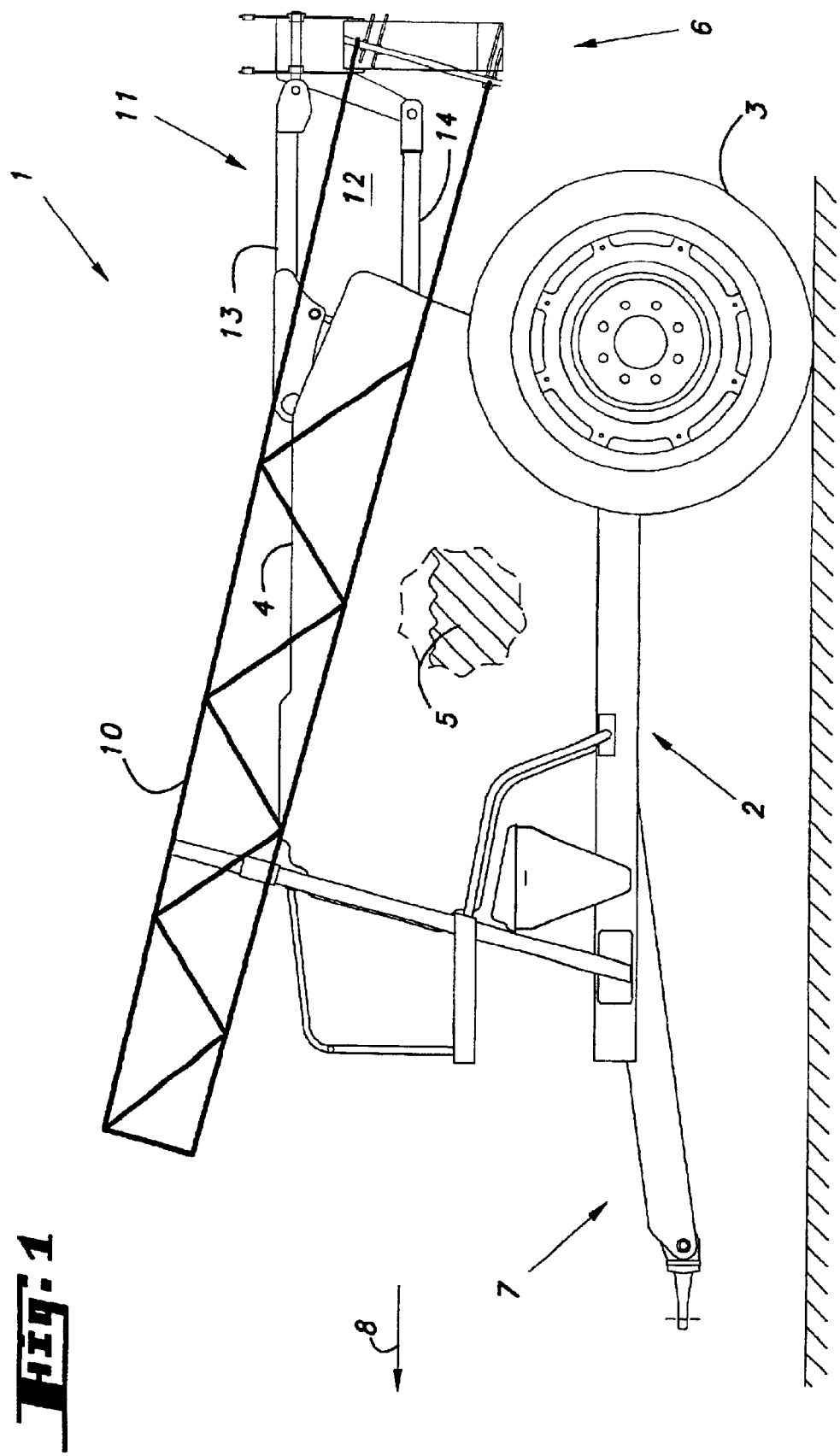
FIG. 1 depicts, in a side view, an agricultural sprayer according to the invention.

FIG. 1 depicts an agricultural sprayer 1 according to the invention, in the transport position. Said sprayer 1 comprises a chassis 2 which runs along the ground by means of two wheels 3. Said chassis 2 supports, on one hand, a tank 4 containing a product 5 and, on another hand, a number of spray nozzles (not depicted) arranged at substantially regular intervals along a spray boom 6. Said chassis 2 is connected, in a known way, to a motor vehicle (not depicted) by means of a drawbar 7. Said motor vehicle trails said sprayer 1 in a direction of forward travel 8. In this exemplary embodiment, said sprayer 1 is therefore of the trail type. It goes without saying that the present invention also covers sprayers of the mounted type and self-propelled sprayers.

Said spray boom 6 is connected to said chassis 2 by means of a connecting device 11. During work, said spray boom 6 is arranged transversely to said direction of forward travel 8 on each side of a vertical mid-plane 9 (FIG. 3) of said sprayer 1, and said nozzles spray said product 5 onto plants to be treated. To do this, said spray boom 6 comprises, in a known way, a latticework structure 10 the lower part of which supports said nozzles. Said latticework structure 10 is advantageously broken down into sections. Said sections are articulated together so that said spray boom 6 can be folded a number of times along said sprayer 1 for transport.

In order to adapt the spray height of said nozzles to the taller or shorter size of the plants to be treated, said connecting device 11 allows said spray boom 6 to be shifted with respect to said chassis 2 in a substantially vertical direction. For this purpose, said connecting device 11 consists of a single deformable quadrilateral 12 which extends at least substantially in said vertical mid-plane 9.

More specifically, in the light of FIG. 2, it can be seen that said quadrilateral 12 comprises an upper arm 13 and a lower arm 14. Said upper arm 13 is connected, on one hand, to said chassis 2 by means of an articulation 15 of axis 15a and, on another hand, to said spray boom 6 by means of an articulation 16 of axis 16a. For its part, said lower arm 14 is connected, on one hand, to said chassis 2 by means of an articulation 17 of axis 17a and, on another hand, to said spray boom 6 by means of an articulation 18 of axis 18a. Said articulations 15, 16, 17, 18 are located substantially in said vertical mid-plane 9 and their respective axes 15a, 16a, 17a, 18a are substantially orthogonal to this same plane 9. It can also be seen that said quadrilateral 12 can be deformed by means of an actuator 19, the line of action of which is advantageously substantially contained in said vertical mid-plane 9. According to the exemplary embodiment depicted, said actuator 19 is a ram 20 connected, on one hand, to said chassis 2 by means of an articulation 21 of axis 21a and, on another hand, to said upper arm 13 by means of an articulation 22 of axis 22a. Said articulations 21, 22 are also located substantially in said vertical mid-plane 9 and their respective axes 21a, 22a are also substantially orthogonal to this plane 9.

According to one feature of the present invention, most of the stress imposed by said spray boom 6 on said connecting device 11 is taken by a single arm known as the carrying arm 23. The second arm of said connecting device 11 is, for its part, known as the orienting arm 24 and its sole purpose is to maintain the angular orientation of said spray boom 6 about a transverse axis of said sprayer 1. An architecture such as this makes it possible to have a master component which is proportioned accordingly and another component of lighter design. In the example of FIG. 2, said ram 20 acts on said upper arm 13. In consequence, it is this latter arm which will act as carrying arm 23, and the lower arm 14 will therefore be the orienting arm 24. It is also possible to conceive of a connecting device 11 in which the upper arm 13 is the orienting arm and the lower arm 14 is the carrying arm.

In the exemplary embodiment of a carrying arm 23 depicted in FIGS. 4 and 5, said carrying arm 23 comprises a square tube 25 arranged transversely to the vertical mid-plane 9, and a rectangular tube 26 arranged in said vertical mid-plane 9. Said square tube 25 is connected to said rectangular tube 26 by welding, and this connection is reinforced by two gussets 27. In this exemplary embodiment, said articulation 16 which connects said carrying arm 23 to said spray boom 6 is achieved, on the same side as the carrying arm 23, using two devises 28, 29, the axes 28a, 29a of which are coincident with said axis 16a. Said devises 28, 29 consist respectively of two uprights 30 connected to said square tube 25. Said carrying arm 23 also comprises two plates 31 welded to said rectangular tube 26 one on each side of said vertical mid-plane 9. Said plates 31 are pierced respectively with two holes 32, 33 of respective axes 32a, 33a. Said holes 32 are used to produce, at the same side as the carrying arm 23, the articulation 15 and their respective axes 32a are coincident with the axis 15a. Said holes 33 are used, for their part, to produce the articulation 22, and their respective axes 33a are therefore coincident with the axis 22a. A box design such as this advantageously allows said carrying arm 23 to acquire good rigidity with respect to bending and torsional stresses imposed by said spray boom 6. In this exemplary embodiment, said carrying arm 23 has, when viewed from above, the shape of a T, the head of which is located on the same side as the boom 6. An arrangement such as this makes it possible, for its part, also to obtain good rigidity in the connection between said boom 6 and said carrying arm 23. According to another exemplary embodiment, said carrying arm 23 is made up of said rectangular tube 26, of said plates 31, and said articulation 16 is achieved by a single clevis placed in the continuation of said rectangular tube 26. According to an additional other example, said carrying arm 23 has the shape of a T, the head of which is, this time, located on the same side as the chassis 2. It is also possible to conceive of a combination of the two T-shapes described hereinabove. This then yields an I-shaped carrying arm 23 with its head on the same side as the boom 6 and its foot on the same side as the chassis 2.

Figure 6:
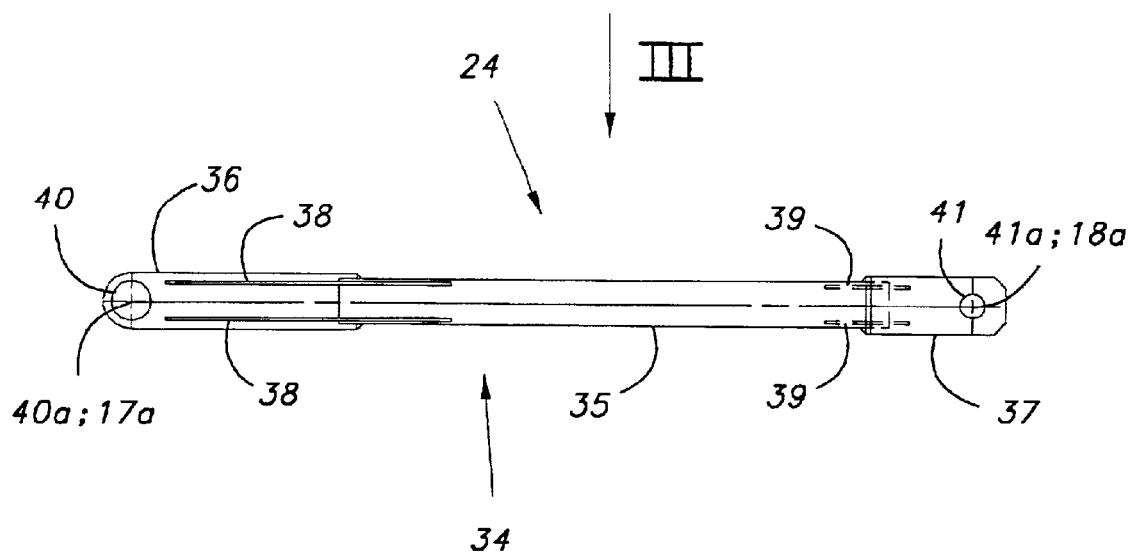
FIG. 6 depicts, in a side view, an exemplary embodiment of an orienting arm according to the invention.
Figure 7:
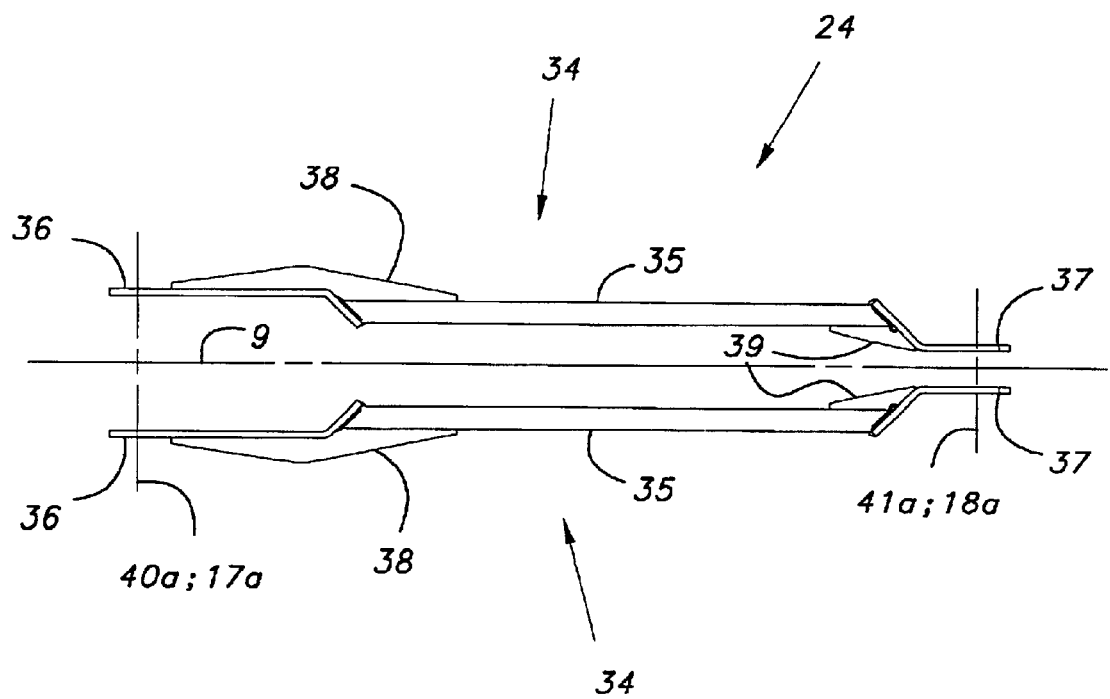
FIG. 7 depicts, in a view in the direction of arrow III, the orienting arm of FIG. 6.

In the exemplary embodiment of an orienting arm 24 depicted in FIGS. 6 and 7, said orienting arm 24 is made up of two stringers 34 arranged symmetrically on each side of the vertical mid-plane 9. Each stringer 34 consists of a rectangular tube 35, the ends of which are connected respectively to a front plate 36 and to a rear plate 37. The connections between said rectangular tube 35 and said plates 36, 37 are strengthened by respective gussets 38, 39. Said front plates 36 are pierced respectively with a hole 40 of axis 40a, and said rear plates 37 are pierced respectively with a hole 41 of axis 41a. Said holes 40 are used, on the same side as the orienting arm 24, to produce the articulation 17, and their respective axes 40a are coincident with the axis 17a. Said holes 41 are used, for their part, to produce the articulation 18, and their respective axes 41a are coincident with the axis 18a. In this exemplary embodiment, said orienting arm 24 has said ram 20 passing through it. In order to leave a passage for said ram 20, the distance between the two front plates 36 is advantageously greater than the distance between the two back plates 37. According to another exemplary embodiment, said stringers 34 are brought closer together so that the two rear plates 37 are placed side by side.

With a view to keeping said nozzles in a given spraying direction (in this case substantially vertical) irrespective of the spraying height chosen, said quadrilateral 12 described in this exemplary embodiment is substantially a parallelogram. However, the present invention also relates to a connecting device 11 in which said quadrilateral 12 is a trapezium. This may prove advantageous if there is a desire to impart a rotational movement about a transverse axis on said spray boom 6 when shifting this boom with respect to said chassis 2.

Likewise, it is also possible to conceive of a sprayer 1 in which the connecting device 11 is not connected directly to said chassis 2 but is connected via a support which is fixed, removably or not removably, to said chassis 2.

The connecting device 11 and the agricultural sprayer 1 which have just been described are merely one exemplary embodiment and example of use which must not in any way be taken as restricting the field of protection defined by the claims which follow.

What is claimed as new and desired to be secured by Letters Patent of the United States is:

1. A connecting device connecting a spray boom to a chassis of an agricultural sprayer, comprising:
    a single quadrilateral including an upper arm and a lower arm, one of said upper arm and lower arm being a carrying arm and the other arm being an orienting arm,
    wherein said carrying arm has a T-shaped structure including a head T that is located on a same side as said spray boom, and said single quadrilateral is arranged in a plane which is substantially vertical and substantially parallel to a longitudinal plane of said sprayer.

2. The connecting device as claimed in claim 1, wherein said quadrilateral is contained in a vertical mid-plane of said chassis.

3. The connecting device as claimed in claim 1, wherein said quadrilateral is deformable.

4. The connecting device as claimed in claim 3, wherein said quadrilateral is deformed by an actuator.

5. The connecting device as claimed in claim 4, wherein said actuator acts on said carrying arm.

6. The connecting device as claimed in claim 4, wherein said orienting arm is widened to leave a passage for said actuator.

7. The connecting device as claimed in claim 4, wherein said actuator is a ram.

8. The connecting device as claimed in claim 1, wherein said quadrilateral is a trapezium.

9. The connecting device as claimed in claim 1, wherein said quadrilateral is a parallelogram.

10. The connecting device as claimed in claim 1, wherein the upper arm and the lower arm are connected, on one hand, to the chassis and, on another hand, to said spray boom by respective articulations, the respective axes of which are substantially orthogonal to said plane containing said quadrilateral.

11. The connecting device as claimed in claim 10, wherein said articulations are located in said plane containing said quadrilateral.

12. An agricultural sprayer comprising at least one spray boom connected to a chassis by a connecting device as claimed in claim 1.

13. The agricultural sprayer as claimed in claim 12, which sprayer is of a trailed type.

14. The agricultural sprayer as claimed in claim 12, which sprayer is of a mounted type.

15. The agricultural sprayer as claimed in claim 12, which sprayer is of a self-propelled type.

* * * * *